(12) United States Patent
Yamawaki

(10) Patent No.: US 11,971,854 B2
(45) Date of Patent: Apr. 30, 2024

(54) INFORMATION PROCESSING APPARATUS, INFORMATION PROCESSING SYSTEM, INFORMATION PROCESSING METHOD, AND NON-TRANSITORY RECORDING MEDIUM

(71) Applicant: Taku Yamawaki, Tokyo (JP)

(72) Inventor: Taku Yamawaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/069,510

(22) Filed: Dec. 21, 2022

(65) Prior Publication Data

US 2023/0244640 A1    Aug. 3, 2023

(30) Foreign Application Priority Data

Feb. 1, 2022    (JP) .................................. 2022-014286

(51) Int. Cl.
*G06F 3/0482*    (2013.01)
*G06F 3/04842*    (2022.01)
*G06F 16/16*    (2019.01)

(52) U.S. Cl.
CPC .......... *G06F 16/168* (2019.01); *G06F 3/0482* (2013.01); *G06F 3/04842* (2013.01)

(58) Field of Classification Search
CPC ... G06F 3/04842; G06F 3/0482; G06F 16/168
See application file for complete search history.

(56) References Cited

U.S. PATENT DOCUMENTS

| 2006/0085474 | A1* | 4/2006 | Tsubono | G06F 16/58 |
| | | | | 707/999.102 |
| 2010/0257179 | A1* | 10/2010 | Arrouye | G06F 16/13 |
| | | | | 707/812 |
| 2014/0067456 | A1 | 3/2014 | Kashida | |
| 2015/0172364 | A1* | 6/2015 | Toyoda | G06F 3/04817 |
| | | | | 715/719 |
| 2015/0183208 | A1 | 7/2015 | Yamawaki et al. | |
| 2016/0080605 | A1 | 3/2016 | Kuwano et al. | |
| 2017/0308646 | A1 | 10/2017 | Yamawaki | |
| 2018/0143947 | A1* | 5/2018 | Jain | H04L 67/01 |
| 2018/0181452 | A1 | 6/2018 | Yamawaki et al. | |

(Continued)

FOREIGN PATENT DOCUMENTS

| JP | 2003-050691 | 2/2003 |
| JP | 2006-031464 | 2/2006 |

(Continued)

*Primary Examiner* — Anil K Bhargava
(74) *Attorney, Agent, or Firm* — IPUSA, PLLC

(57) ABSTRACT

An information processing apparatus, an information processing system, an information processing method, and a non-transitory recording medium. The information processing apparatus receives a plurality of files, generates screen information for displaying a first list screen on a display, the first list screen presenting, for each of the plurality of files, a name and a time of last use of the file, and further presenting a thumbnail image of at least one file of the plurality of files in a case the at least one file is an image file, stores in one or more memories, the plurality of files and the thumbnail image of the at least one file being the image file, and transmits the screen information of the first list screen in response to a request.

10 Claims, 13 Drawing Sheets

(56) References Cited

U.S. PATENT DOCUMENTS

2020/0012547 A1   1/2020  Yamawaki et al.
2020/0076981 A1*  3/2020  Murata .............. H04N 1/32122

FOREIGN PATENT DOCUMENTS

| JP | 2007-074406 | 3/2007 |
| JP | 2014-049059 | 3/2014 |
| JP | 2014-171067 | 9/2014 |

* cited by examiner

FIG. 10

■Warning
Following files are not used for some time.
Please select whether to keep the file or delete the file.

Last Used Date: 09/12/2020 ~91
File Name:xxxxxxxx.doc ~94
Keep ~97
Delete ~100

Last Used Date: 12/31/2020 ~92
File Name:xxxxxxxx.jpg ~95
Thumbnail ~103
Keep ~98
Delete ~101

Last Used Date: 01/18/2020 ~93
File Name:xxxxxxxx.txt ~96
Keep ~99
Delete ~102

~90

INFORMATION PROCESSING APPARATUS, INFORMATION PROCESSING SYSTEM, INFORMATION PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-014286, filed on Feb. 1, 2022, in the Japan Patent Office, the entire disclosure of which is hereby incorporated by reference herein.

BACKGROUND

Technical Field

The present disclosure relates to an information processing apparatus, an information processing system, an information processing method, and a non-transitory recording medium.

Related Art

Remote work became possible with cloud services, for example, by storing files such as business document files and image files in storage provided by the cloud services and accessing these files from home or the like through the internet. A technique for determining whether an image file is a file for private use by inspecting a character string obtained by character recognition is known.

SUMMARY

Embodiments of the present disclosure describe an information processing apparatus, an information processing system, an information processing method, and a non-transitory recording medium. The information processing apparatus receives a plurality of files, generates screen information for displaying a first list screen on a display, the first list screen presenting, for each of the plurality of files, a name and a time of last use of the file, and further presenting a thumbnail image of at least one file of the plurality of files in a case the at least one file is an image file, stores in one or more memories, the plurality of files and the thumbnail image of the at least one file being the image file, and transmits the screen information of the first list screen in response to a request.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 10 is a diagram illustrating an example of an unused file list screen according to 5 the first embodiment of the present disclosure;

Figure 1:
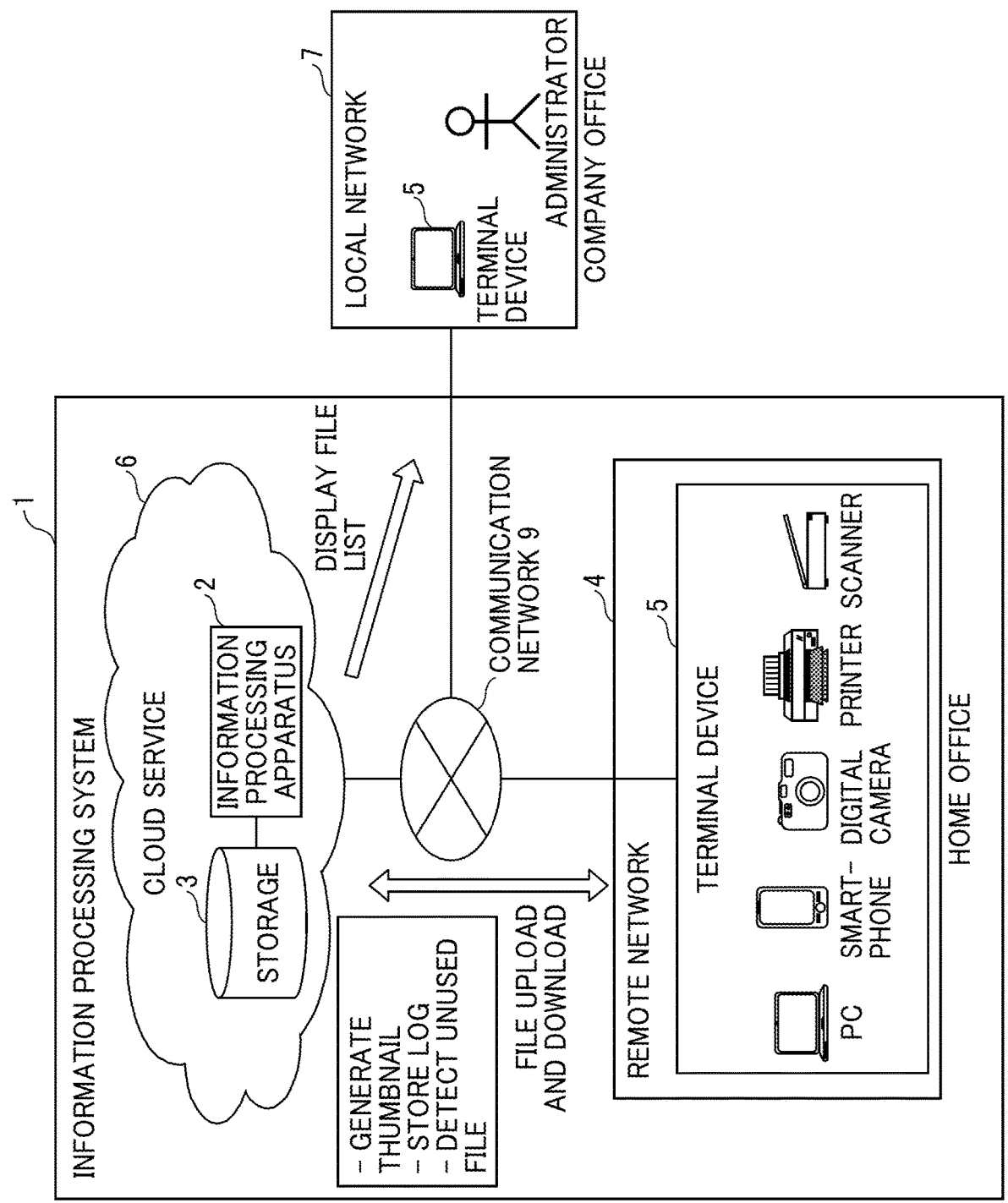
FIG. 1 is a schematic diagram illustrating an example of an information processing system according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a detailed description is given of several embodiments of an information processing apparatus, an information processing system, an information processing method, and a non-transitory recording medium, with reference to the accompanying drawings.

FIG. 1 is a schematic diagram illustrating an example of the information processing system according to a first embodiment of the present disclosure. In the information processing system 1, a cloud service 6 that provides a service for storing files used in business and a terminal device 5 that accesses the cloud service 6 from a remote network 4 residing at an employee's home office or the like are connected to a communication network 9. The cloud service 6 executes user authentication for a user operating the terminal device 5 in order to permit connection of the terminal device 5. Here, a security technology such as virtual private network (VPN) that prevents information leakage may be used in connection between the cloud service 6 and the remote network 4 or the terminal device 5.

The terminal device 5 is used by an employee to create, edit, display, shoot, print, and import files used in business, and the files are uploaded to the cloud service 6 or downloaded from the cloud service 6. The terminal device 5 is, for example, a device or electronic device such as a personal computer (PC), a smartphone, a digital camera, a printer, a scanner, or the like.

The cloud service 6 includes an information processing apparatus 2 and a storage 3. The cloud service 6 stores a thumbnail image of an image file received from the terminal device 5 in the storage 3 together with the received image file. The thumbnail image (or simply a thumbnail) is a reduced image of the image file or a moving image file, and is used when checking the contents of a plurality of image files simultaneously on the same screen. In addition, in order for an administrator to determine private use of data, the cloud service 6 displays a list screen presenting file names and thumbnails simultaneously and integrally on the terminal device 5 operated by the administrator or the like. The terminal device 5 is connected to a local network 7 of a company or the like. Here, the local network 7 is, for example, a network such as an in-house local area network (LAN) in which access from an external network is restricted by a firewall or the like. The cloud service 6 stores information about the received file in the storage 3 as a log. The log includes file upload date and time, user name, file name, file type, file operation information (edit, delete, etc.), file download count, and the like. Furthermore, the cloud service 6 detects unused files based on a usage status of the files stored in the storage 3, and displays a list of the files determined as unused on the terminal device 5 operated by the administrator.

Although the cloud service 6 includes the information processing apparatus 2 and the storage 3 in the example of FIG. 1, the configuration of the cloud service 6 is not limited to this configuration. For example, the information processing apparatus 2 may include the storage 3. The cloud service 6 may be implemented by a plurality of information processing apparatuses 2. In other words, the cloud service 6 may include multiple information processing apparatuses 2. The communication network 9, the remote network 4, and the local network 7 may include, for example, connection through wireless communication such as mobile communication or wireless LAN. The information processing system 1 may include a mediating apparatus for mediating communication between the cloud service 6 and the terminal device 5, which may be implemented by a server. The mediating apparatus may execute some of the functions executed by the cloud service 6, for example, generating the thumbnail image and the like.

Figure 2:
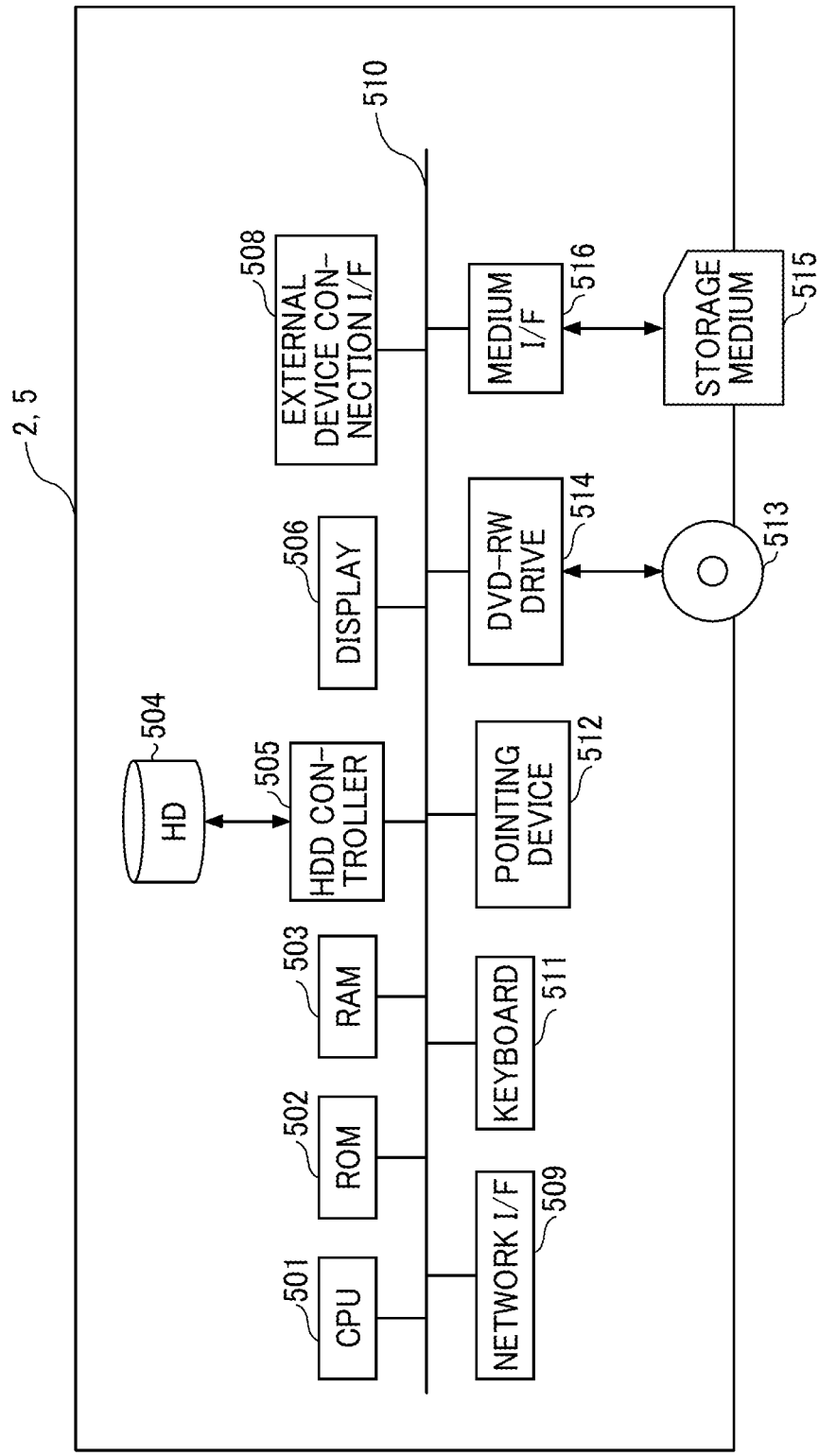
FIG. 2 is a block diagram illustrating an example of a hardware configuration of an information processing apparatus and a terminal device according to the first embodiment of the present disclosure.

FIG. 2 is a block diagram illustrating an example of a hardware configuration of the information processing apparatus 2 and the terminal device 5 according to the embodiments of the present disclosure. As illustrated in FIG. 2, the information processing apparatus 2 and the terminal device 5 are implemented by a computer including a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a digital versatile disc-rewritable (DVD-RW) drive 514, and a medium I/F 516.

Among these components, the CPU 501 controls entire operations of the information processing apparatus 2 and the terminal device 5. The ROM 502 stores a control program such as an initial program loader (IPL) to boot the CPU 501. The RAM 503 is used as a work area for the CPU 501. The HD 504 stores various data such as the programs. The HDD controller 505 controls reading and writing of various data from and to the HD 504 under control of the CPU 501. The display 506 displays various information such as a cursor, menu, window, character, or image. The external device connection I/F 508 is an interface for connecting various external devices. Examples of the external devices include, but are not limited to, a universal serial bus (USB) memory and a printer. The network I/F 509 is an interface that controls communication of data with the external device through the communication network 9. The bus line 510 is, for example, an address bus or a data bus, which electrically connects the components such as the CPU 501 illustrated in FIG. 2.

The keyboard 511 is an example of an input device including a plurality of keys used for inputting characters, numerical values, various instructions, and the like. The pointing device 512 is another example of the input device that allows a user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading and writing (storing) of data from and to a storage medium 515 such as a flash memory.

Figure 3:
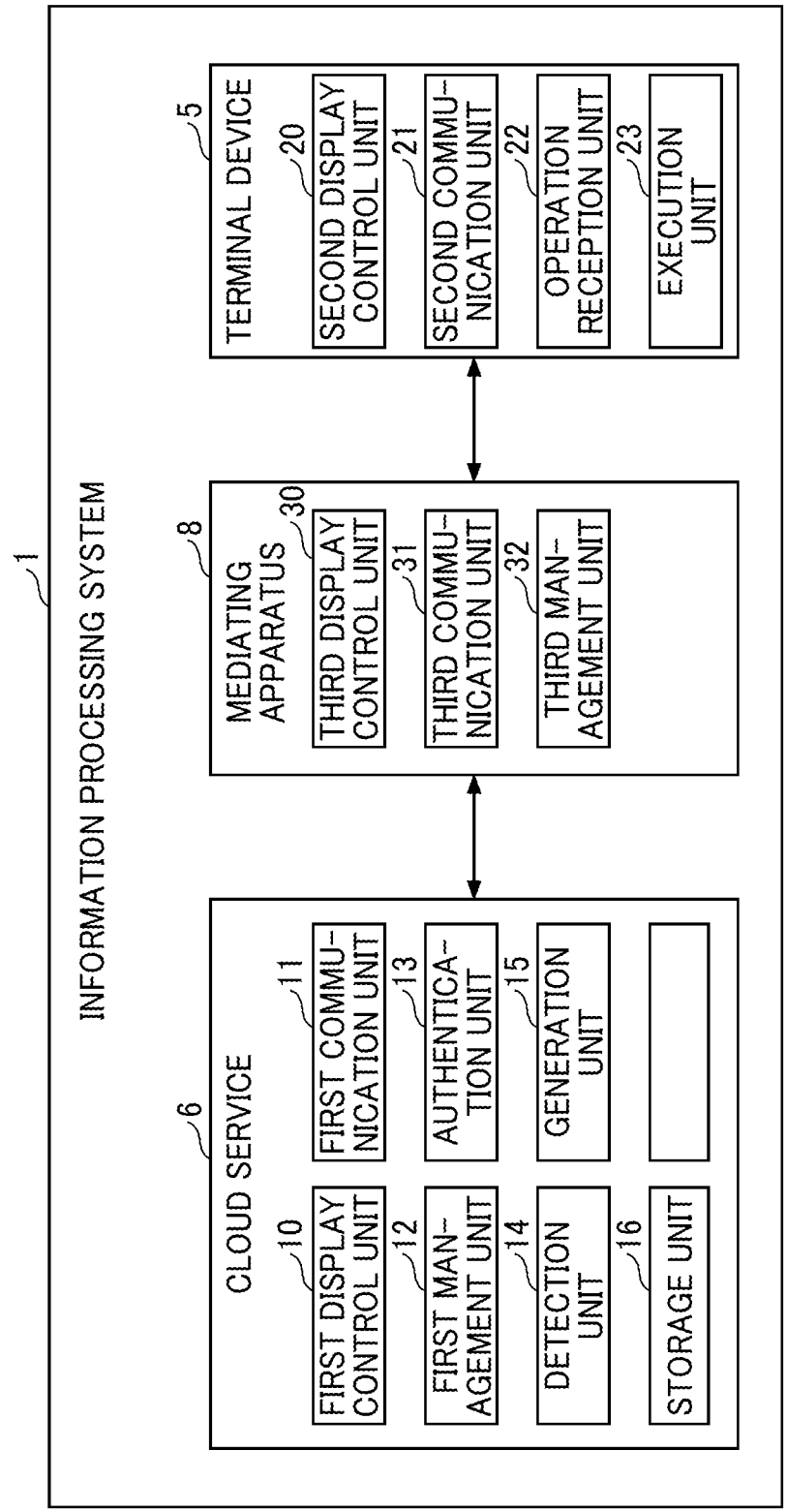
FIG. 3 is a block diagram illustrating an example of a functional configuration of the information processing system according to the first embodiment of the present disclosure.

FIG. 3 is a block diagram illustrating an example of a functional configuration of the information processing system 1 according to the first embodiment of the present disclosure. The information processing system 1 includes the cloud service 6, the mediating apparatus 8, and the terminal device 5. The cloud service 6 includes a first display control unit 10, a first communication unit 11, a first management unit 12, an authentication unit 13, a detection unit 14, a generation unit 15 and a storage unit 16. These units are functions implemented by the CPU 501 executing commands included in one or more programs installed in the information processing apparatus 2 that implements the cloud service 6. The storage unit 16 is implemented by a storage device such as the HD 504 included in the storage 3 or the information processing apparatus 2, for example.

The first display control unit 10 creates screen information related to a login screen, a menu screen, a file list screen, a thumbnail list screen, and the like to be displayed on the terminal device 5. The first display control unit 10 creates screen information for a list screen that simultaneously displays the file name and the thumbnail image for an image file.

The first communication unit 11 is a communication function included in the cloud service 6, and transmits and receives information to and from the mediating apparatus 8 and the terminal device 5 operated by the user or the administrator through the communication network 9.

The first management unit 12 manages the mediating apparatus 8 that connects to the cloud service 6. For example, the first management unit 12 permits connection from the mediating apparatus 8 having an internet protocol (IP) address assigned in advance.

The authentication unit 13 performs user authentication for the user or the administrator who logs in to the cloud service 6. The authentication unit 13 also manages the user who logs in to the cloud service 6 and stores authentication information used for the user authentication.

The detection unit 14 checks the usage status of the files uploaded to the cloud service 6, and detects a file that has not been used for a long period of time as an unused file.

In the case a file uploaded to the cloud service 6 is the image file, the moving image file, or the like, the generation unit 15 generates a reduced thumbnail image for confirming the content of the image.

The storage unit 16 stores a log that is information about files uploaded to the cloud service 6 and thumbnail images generated by the generation unit 15 together with the uploaded files. The log includes file upload date and time, user name, file name, file type, file operation information (edit, delete, etc.), file download count, and the like.

The terminal device 5 includes a second display control unit 20, a second communication unit 21, an operation reception unit 22 and an execution unit 23. These units are functions implemented by the CPU 501 executing instructions included in one or more programs installed in the terminal device 5.

The second display control unit 20 uses the received screen information to display a login screen, a menu screen, and the like on the terminal device 5.

The second communication unit 21 is a communication function included in the terminal device 5, and transmits and receives information to and from the mediating apparatus 8 or the cloud service 6 through the communication network 9.

The operation reception unit 22 receives operations such as character input and button depression by the user through the keyboard and pointing device of the terminal device 5.

The execution unit 23 executes a requested task (printing, reading, etc.) according to the device type (printer, scanner, etc.) of the terminal device 5.

The mediating apparatus 8 includes a third display control unit 30, a third communication unit 31 and a third management unit 32.

These units are functions implemented by the CPU 501 executing instructions included in one or more programs installed in the information processing apparatus 2 that implements the mediating apparatus 8.

The third display control unit 30 creates the screen information related to the login screen, menu screen, file list screen, thumbnail list screen, and the like to be displayed on the terminal device 5, in the case the first display control unit 10 of the cloud service 6 does not create the screen information.

The third communication unit 31 is the communication function included in the mediating apparatus 8, and transmits and receives information to and from the cloud service 6 and the terminal device 5 through the communication network 9.

The third management unit 32 manages the terminal device 5 connected to the cloud service 6. For example, the third management unit 32 permits connection to the cloud service 6 from a particular terminal device 5 having the predetermined IP address.

Figure 4:
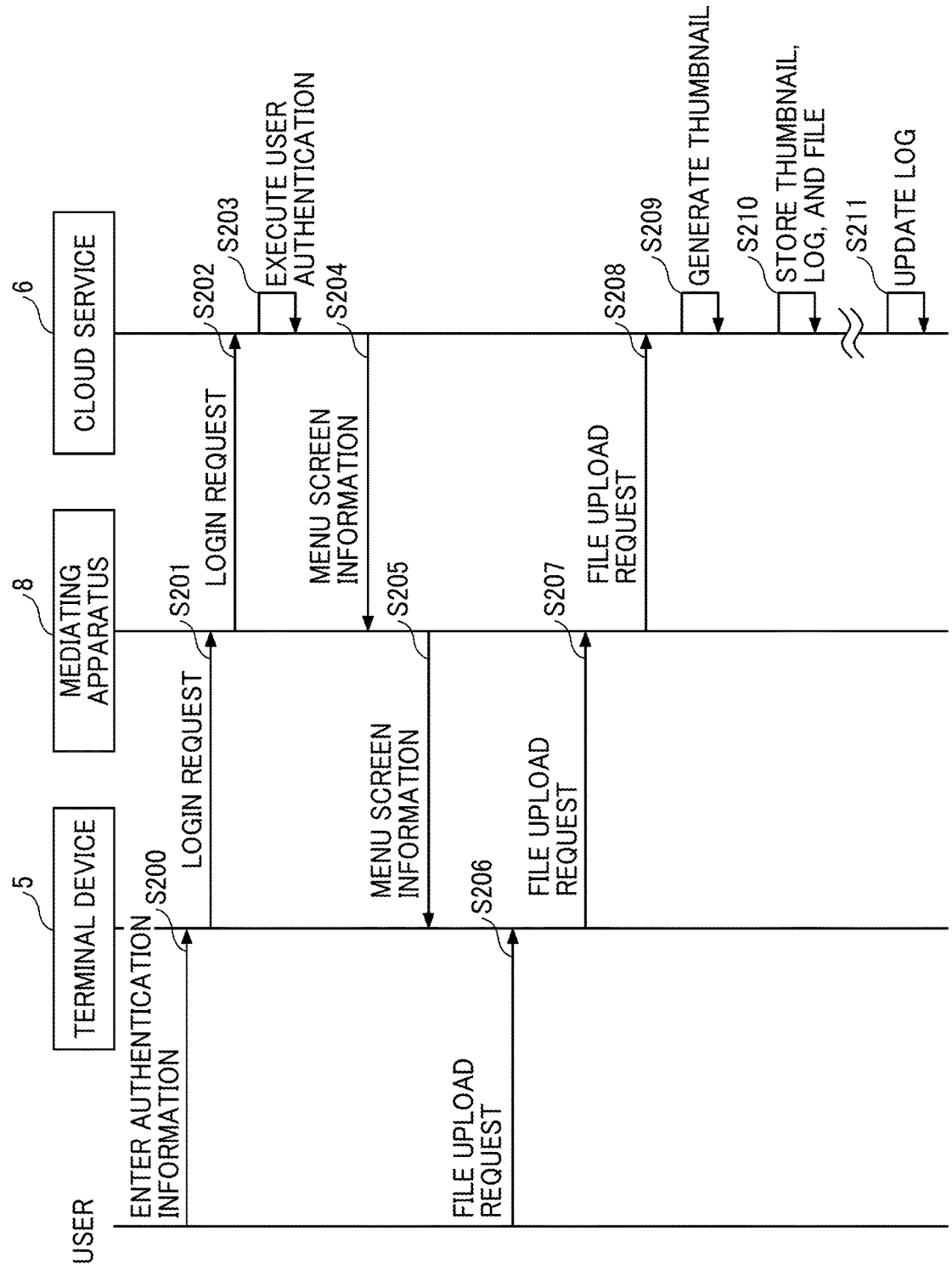
FIG. 4 is a sequence diagram illustrating an example of a file upload process according to the first embodiment of the present disclosure.

FIG. 4 is a sequence diagram illustrating an example of a file upload process according to the first embodiment of the present disclosure. In the file upload process, first, the user operates the terminal device 5 from the remote network 4 to log in to the cloud service 6. Following a successful login process, the user operates the terminal device 5 to upload the file. In the case the image file is uploaded, the cloud service 6 generates the thumbnail and stores the file in a storage device such as the storage 3 together with the log regarding the file and the thumbnail. The processing of each step in FIG. 4 is described below.

In step S200, the second display control unit 20 of the terminal device 5 displays the login screen for logging into the cloud service 6 on the terminal device 5. The operation reception unit 22 of the terminal device 5 receives input of the authentication information (for example, user ID and password) for the user to log in to the cloud service 6.

In step S201, the second communication unit 21 of the terminal device 5 transmits a login request message to the third communication unit 31 of the mediating apparatus 8. The message contains the authentication information entered by the user.

In step S202, the third communication unit 31 of the mediating apparatus 8 transmits the received login request message to the first communication unit 11 of the cloud service 6.

In step S203, the authentication unit 13 of the cloud service 6 authenticates the user based on the received login request message. User authentication is performed by confirming whether the authentication information (user ID and password) included in the received message matches the authentication information stored in the authentication unit 13. Based on a determination that the authentication information included in the received message matches the authentication information stored in the authentication unit 13, the user is authenticated. Otherwise, the authentication is failed. The process proceeds to the next step S204, following a successful authentication.

In step S204, the first communication unit 11 of the cloud service 6 transmits screen information of the menu screen to be displayed on the terminal device 5 to the third communication unit 31 of the mediating apparatus 8.

In step S205, the third communication unit 31 of the mediating apparatus 8 transmits the screen information of the menu screen to the second communication unit 21 of the terminal device 5. The second display control unit 20 of the terminal device 5 displays on the terminal device 5, the menu screen for uploading and downloading files to the cloud service 6 based on the received screen information.

In step S206, the operation reception unit 22 of the terminal device 5 receives an input operation requesting a file upload by the user.

In step S207, the second communication unit 21 of the terminal device 5 transmits a request message requesting the file upload to the third communication unit 31 of the mediating apparatus 8. The request message contains the file to upload.

In step S208, the third communication unit 31 of the mediating apparatus 8 transmits the received request message to the first communication unit 11 of the cloud service 6. In step S209, the generation unit 15 of the cloud service 6 generates a thumbnail image in a case the file included in the received request message (the file uploaded by the user) is the image file or the moving image file.

In step S210, the storage unit 16 of the cloud service 6 stores the log regarding the uploaded file and the thumbnail image together with the uploaded file. An example of log information regarding the file is described below.

File name

File size

Image size (the number of vertical and horizontal pixels, and the like for image files)

Date and time of upload

Information related to the user who uploaded the file (user ID, user name, etc.)

Type of uploaded data (document file, image file, video file, etc.)

Content of the last operation or editing of the file (file name/directory change, document/image/movie content update, etc.)

File creation date and time

Date and time when the file was last operated or edited

Information about the user who last operated or edited the file (user ID, user name, name, etc.)

In step S211, the storage unit 16 of the cloud service 6 updates the log generated in step S210 or adds information when the uploaded file is operated, edited, deleted, downloaded, or the like. An example of the information added to the log is listed below.

Date and time when the file was deleted

Information related to the user who deleted the file (user ID, user name, etc.)

Information on file download (date, time, number of times, etc.)

As a result of the above process, the information processing system 1 generates a thumbnail image when the file uploaded by the user is the image file, and stores the log and the thumbnail image of the file together with the file. Storing logs for uploaded files is expected to make the user aware that the files are being monitored and restricts private use of the storage service. Furthermore, by reducing the use of storage, reduction in service usage cost is also expected.

Figure 5:
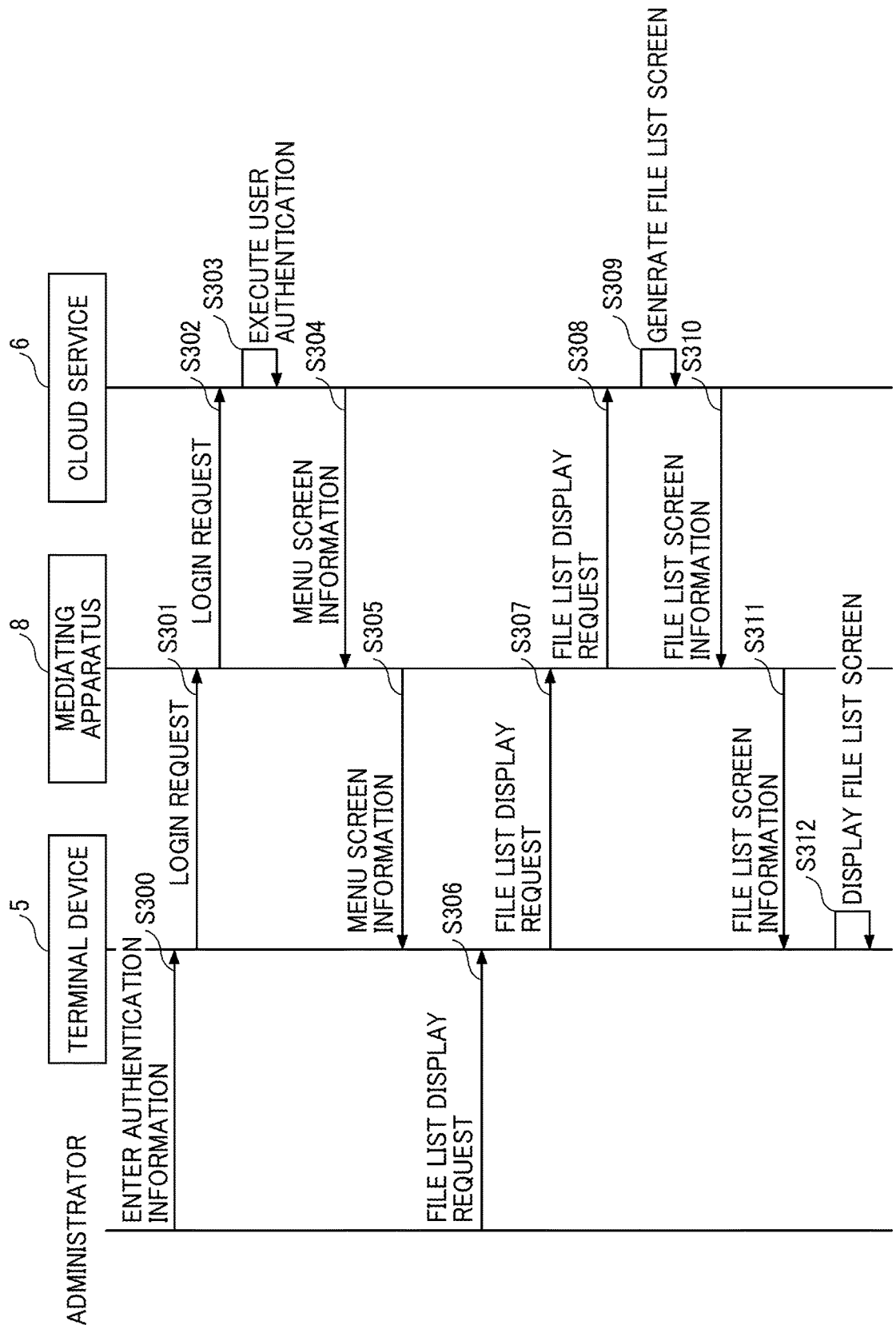
FIG. 5 is a sequence diagram illustrating an example of a file list screen display process according to the first embodiment of the present disclosure.

FIG. 5 is a sequence diagram illustrating an example of a file list screen display process according to the first embodiment of the present disclosure. In the file list screen display process, an administrator logs in to the cloud service 6 by operating the terminal device 5 from the local network 7 of the company or the like. In response to a successful login, the administrator operates the terminal device 5 to request to display the file list. The cloud service 6 transmits information of the file list screen to the terminal device 5 and the file list screen is displayed on the terminal device 5. The process of each step in FIG. 5 is described below.

In steps S300 to S305, the administrator logs into the cloud service 6 by operating the terminal device 5, and causes the terminal device 5 to display a menu screen for displaying the file list. These steps are executed by the same procedure as the processing from step S200 to step S206 illustrated in FIG. 4.

In step S306, the operation reception unit 22 of the terminal device 5 receives an input operation requesting display of the file list by the administrator.

In step S307, the second communication unit 21 of the terminal device 5 transmits a file list display request message to the third communication unit 31 of the mediating apparatus 8.

In step S308, the third communication unit 31 of the mediating apparatus 8 transmits the received request message to the first communication unit 11 of the cloud service 6.

In step S309, the first display control unit 10 of the cloud service 6 generates screen information of the file list screen in response to receiving the request message.

In step S310, the first communication unit 11 of the cloud service 6 transmits the screen information of the file list screen to be displayed on the terminal device 5 to the third communication unit 31 of the mediating apparatus 8.

Figure 6:
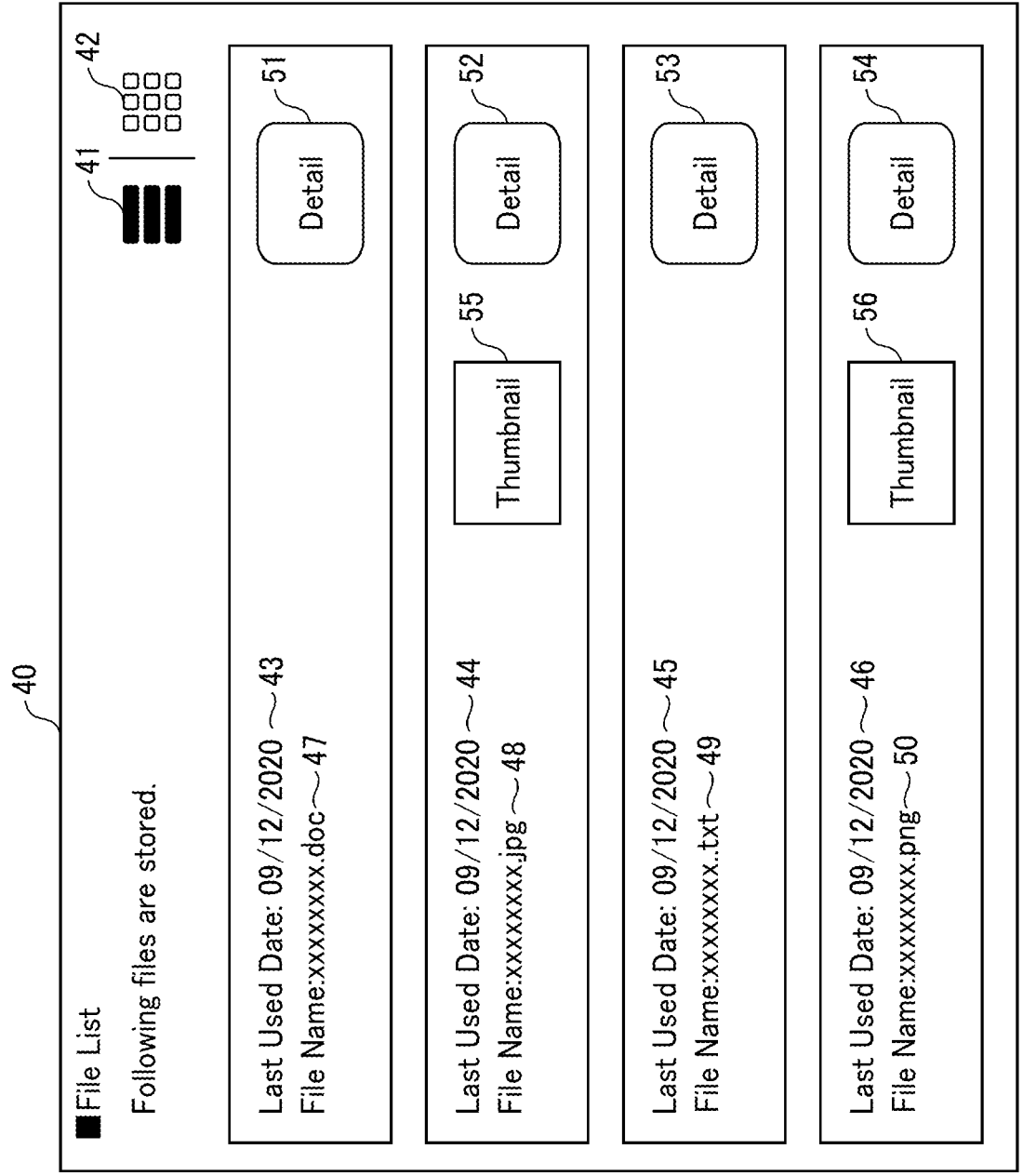
FIG. 6 is a diagram illustrating an example of a file list screen according to the first embodiment of the present disclosure.

In step S311 the third communication unit 31 of the mediating apparatus 8 transmits the received screen information to the second communication unit 21 of the terminal device 5. The second display control unit 20 of the terminal device 5 displays the file list screen on the terminal device 5 based on the received screen information. FIG. 6 is a diagram illustrating an example of the file list screen according to the first embodiment of the present disclosure. The file list screen 40 illustrated in FIG. 6 includes a file list display button 41, a thumbnail list display button 42, last used dates 43 to 46, file names 47 to 50, detail display buttons 51 to 54, and thumbnail display areas 55 and 56. The file list screen 40 is an example of a first list screen.

The file list display button 41 is a button to be pressed to display the file list on the screen, and the file list screen 40 in FIG. 6 is in a state where this button is pressed.

The thumbnail list display button 42 is a button to be pressed to display a list of thumbnails on the screen.

The last used dates 43 to 46 are the dates and times when the files were last used, for example, the dates when the files were created, edited or updated. The date of last use may include time information, and may be referred to as time of last use, date and time of last use, or the like.

The file names 47 to 50 are names of files such as document files and image files.

Specifically, file names 47 and 49 are document files, and file names 48 and 50 are image files.

The detail display buttons 51 to 54 are buttons to be pressed when displaying details of a file.

The thumbnail display areas 55 and 56 are areas for displaying thumbnail images when the file type is an image file (file name 48, file name 50, etc.).

Figure 7:
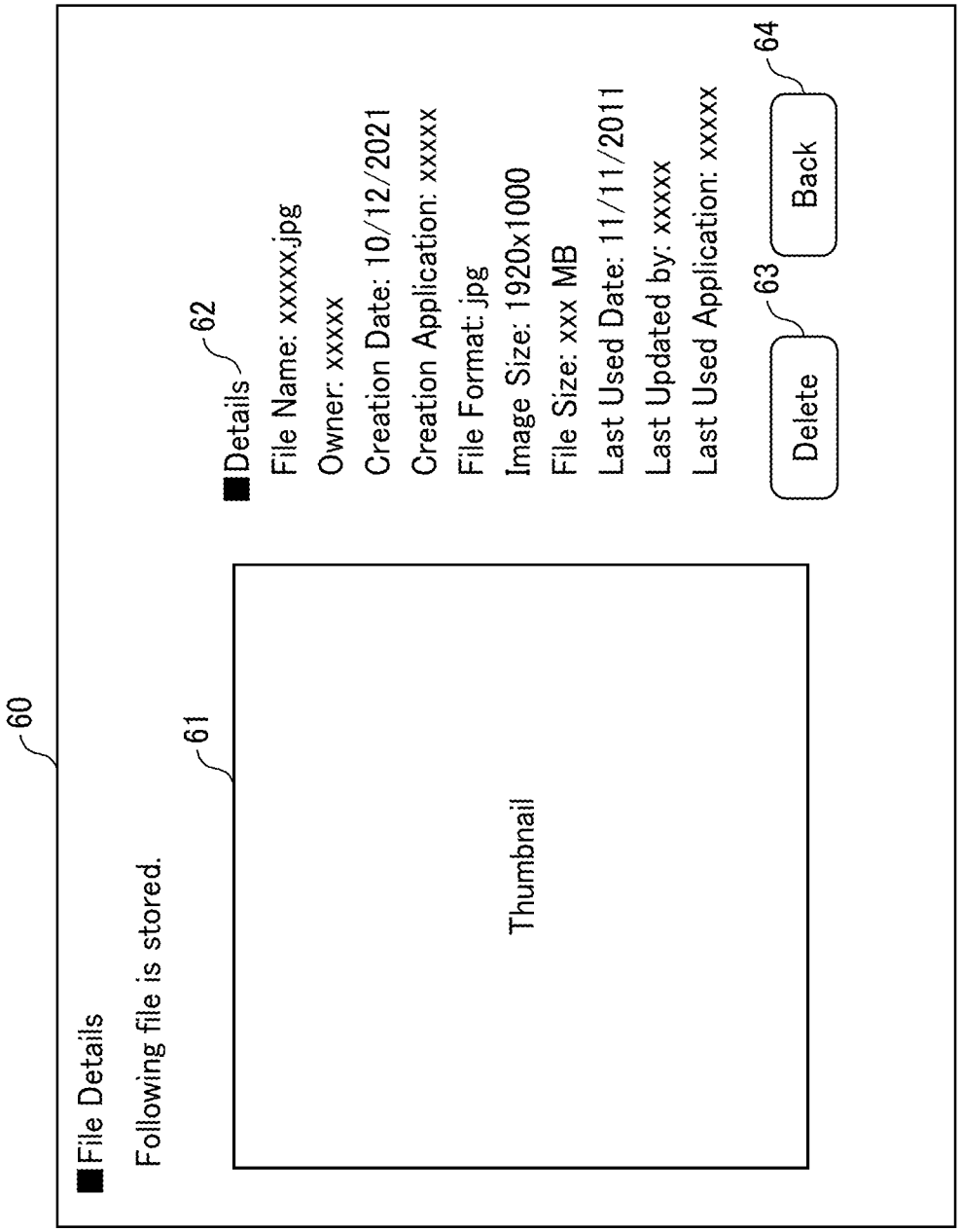
FIG. 7 is a diagram illustrating an example of a file detail screen according to the first embodiment of the present disclosure.

FIG. 7 is a diagram illustrating an example of a file detail screen according to the first embodiment of the present disclosure. The file detail screen 60 illustrated in FIG. 7 is a screen illustrating detailed information of a file displayed in response to pressing any of the detail display buttons 51 to 54 in FIG. 6. The file detail screen 60 includes a thumbnail display area 61, detailed information 62, a delete button 63 and a back button 64.

The thumbnail display area 61 is an area for displaying the thumbnail image when the file type is the image file.

The detailed information 62 includes "file name", "owner", "creation date", "creation application", "file format", "image size", "file size", "last used date", "last updated by" and "last used application". These items are displayed based on the information included in the log stored and updated in steps S210 and S211 in the file upload process illustrated in FIG. 4.

The delete button 63 is a button to be pressed for deleting a file whose detailed information is being displayed.

The back button 64 is a button to be pressed for returning to the file list screen 40 of FIG. 6 which was displayed before the file detail screen 60 is displayed.

Figure 8:
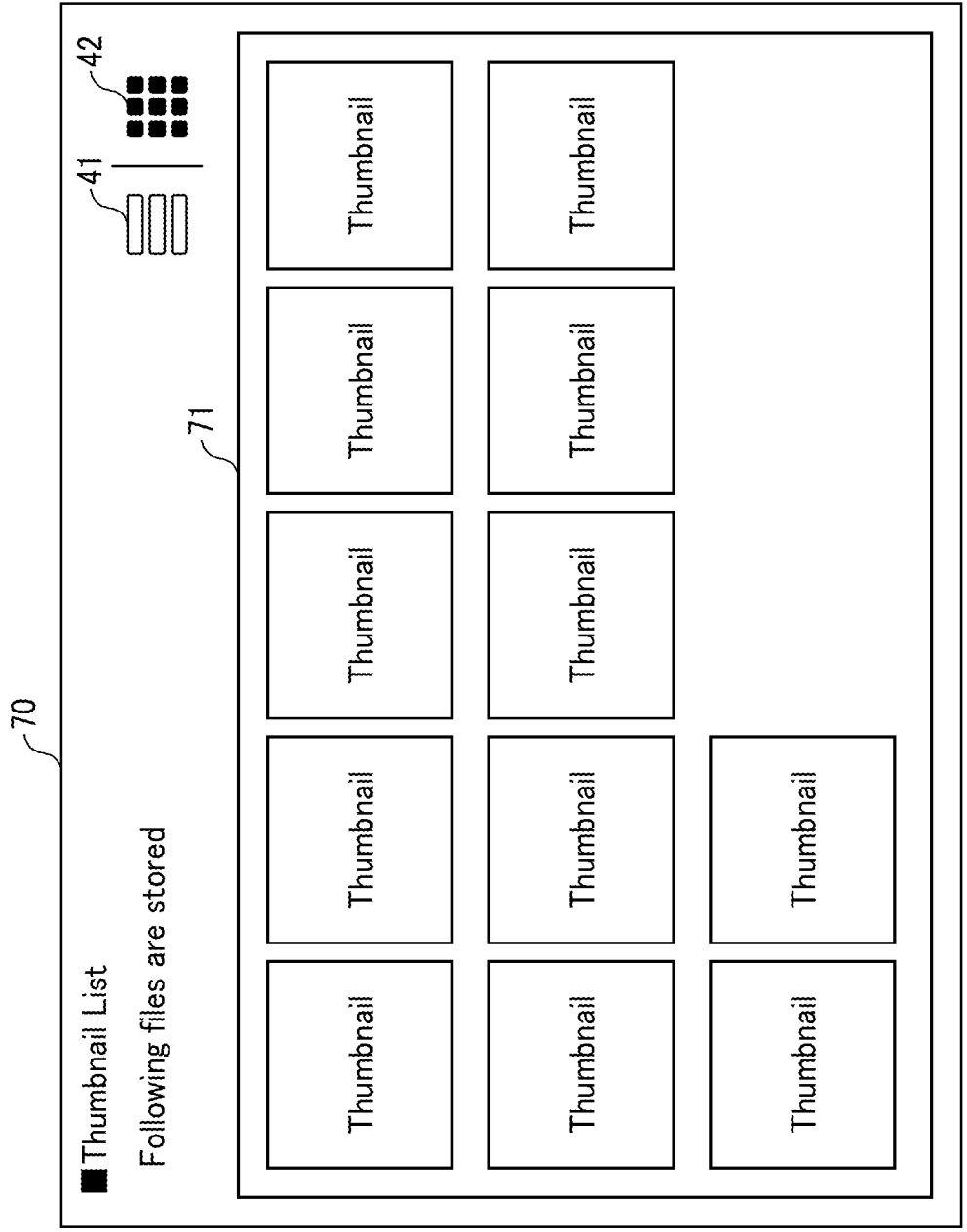
FIG. 8 is a diagram illustrating an example of a thumbnail list screen according to the first embodiment of the present disclosure.

FIG. 8 is a diagram illustrating an example of the thumbnail list screen according to the first embodiment of the present disclosure. The thumbnail list screen 70 illustrated in FIG. 8 is a list screen in which thumbnail images are displayed in response to receiving a pressing of the thumbnail list display button 42 illustrated in FIG. 6. The thumbnail list screen 70 includes a file list display button 41, a thumbnail list display button 42, and a thumbnail list display area 71. The thumbnail list screen 70 is an example of the second list screen.

The file list display button 41 is a button to be pressed when displaying a list of files on the screen, and is the same as the button illustrated in FIG. 6.

The thumbnail list display button 42 is a button to be pressed for displaying a list of thumbnails on the screen, and the thumbnail list screen 70 of FIG. 8 is in a state where this button is pressed.

The thumbnail list display area 71 is an area in which a list of thumbnail images for image files or the like is displayed, and the contents of a plurality of image files can be confirmed on this screen. Further, in response to a pressing of the image area of each thumbnail image, the file detail screen 60 illustrated in FIG. 7 for the corresponding image file may be displayed.

As described above, the information processing system 1 provides a user interface that displays information about the file (file name and date of last use) on the list screen together with the thumbnail image when the file uploaded to the cloud service 6 is an image file. The administrator can easily check whether the image files such as photographs are for private use on the thumbnail list screen 70. In addition, the administrator can easily display detailed information or delete files determined to be for private use.

Figure 9:
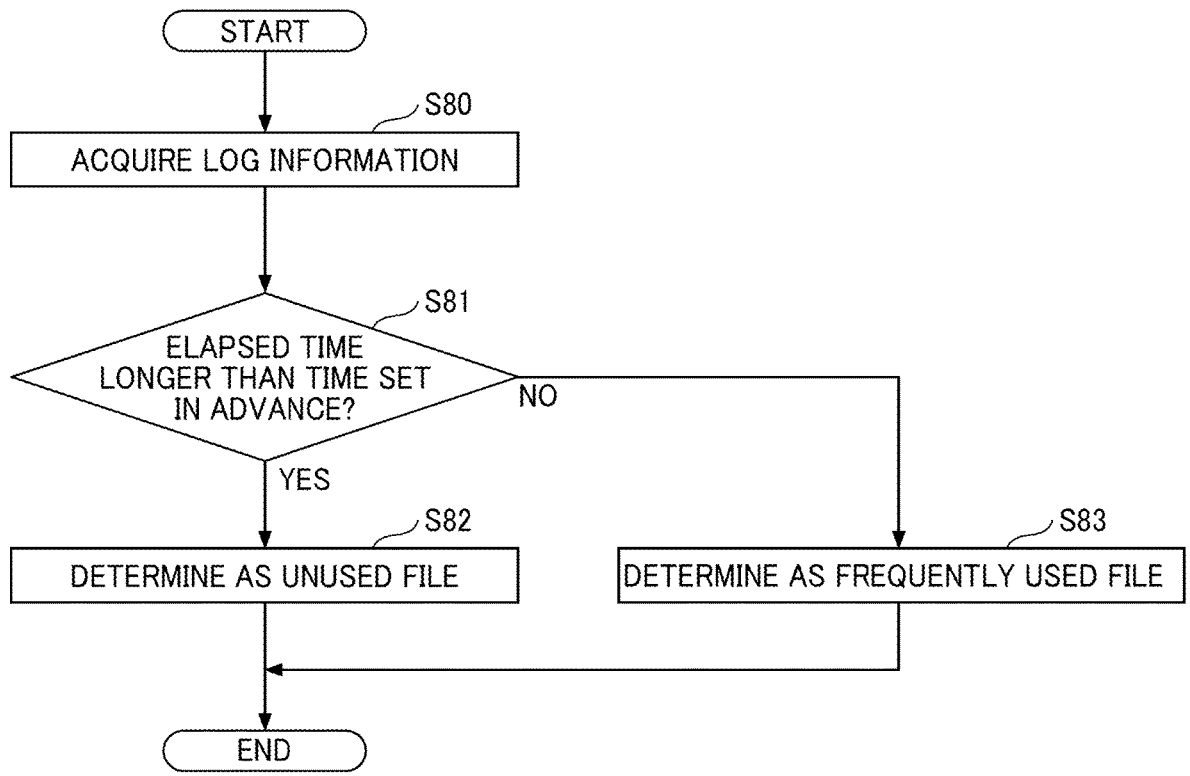
FIG. 9 is a flowchart illustrating an example of an unused file detection process according to the first embodiment of the present disclosure.

FIG. 9 is a flowchart illustrating an example of an unused file detection process according to the first embodiment of the present disclosure. In the unused file detection process, the cloud service 6 determines whether the uploaded file is an unused file based on the usage status of the file. The process of each step in FIG. 9 is described below.

In step S80, the detection unit 14 of the cloud service 6 acquires the log stored in the storage unit 16 in the file upload process illustrated in FIG. 4.

In step S81, the detection unit 14 of the cloud service 6 calculates elapsed time since the file was created, edited, or updated based on the information included in the acquired log. Specifically, the elapsed time is calculated as the time from the date and time the file was last used (the date and time when the file was created or when the file was last operated or edited) included in the log, to the current date and time. The detection unit 14 of the cloud service 6 proceeds the process to step S82 when the calculated elapsed time is longer than a time period set in advance (for example, 30 days, etc.), and otherwise proceeds to step S83.

In step S82, the detection unit 14 of the cloud service 6 determines that the file corresponding to the acquired log is the unused file.

In step S83, the detection unit 14 of the cloud service 6 determines that the file corresponding to the acquired log is a frequently used file.

As described above, the cloud service 6 determines that files that have not been used for a long period of time are unused files. The unused files are detected according to the usage status of the files.

Furthermore, the cloud service 6 presents a list of unused files to the user or administrator based on the results of unused file detection for all uploaded files. Specifically, the first display control unit 10 of the cloud service 6 creates screen information for the unused file list screen based on the unused file detection result. The first communication unit 11 of the cloud service 6 transmits screen information of the unused file list screen to the second communication unit of the terminal device 5. The second display control unit 20 of the terminal device 5 displays the unused file list screen on the terminal device 5 based on the received screen information. Alternatively, the first communication unit 11 of the cloud service 6 transmits information regarding the list of unused files to the second communication unit of the terminal device 5, and the second display control unit 20 of the terminal device 5 may display the unused file list screen on the terminal device 5 based on the received information.

FIG. 10 is a diagram illustrating an example of the unused file list screen according to the first embodiment of the present disclosure. The unused file list screen 90 illustrated in FIG. 10 is a list of unused files detected by the unused file detection process illustrated in FIG. 9, and includes last used dates 91 to 93, file names 94 to 96, keep buttons 97 to 99, delete buttons 100 to 102, and a thumbnail display area 103. The unused file list screen 90 is an example of a third list screen.

The last used dates 91 to 93 are the dates in which the files were last used, that is, the dates when the files were created or last edited or updated.

The file names 94 to 96 are names of files such as document files and image files.

The keep buttons 97 to 99 are buttons that the user or administrator presses to keep the corresponding file as the frequently used file rather than the unused file.

The delete buttons 100 to 102 are buttons that the user or administrator presses when deleting the corresponding file because the file is the unused file.

The thumbnail display area 103 is an area for displaying the thumbnail image when the file type is the image file.

By checking the unused file list screen 90, the user or administrator is able to determine whether to delete a file that is not used for some time, and efficiently delete unused files.

Figure 11:
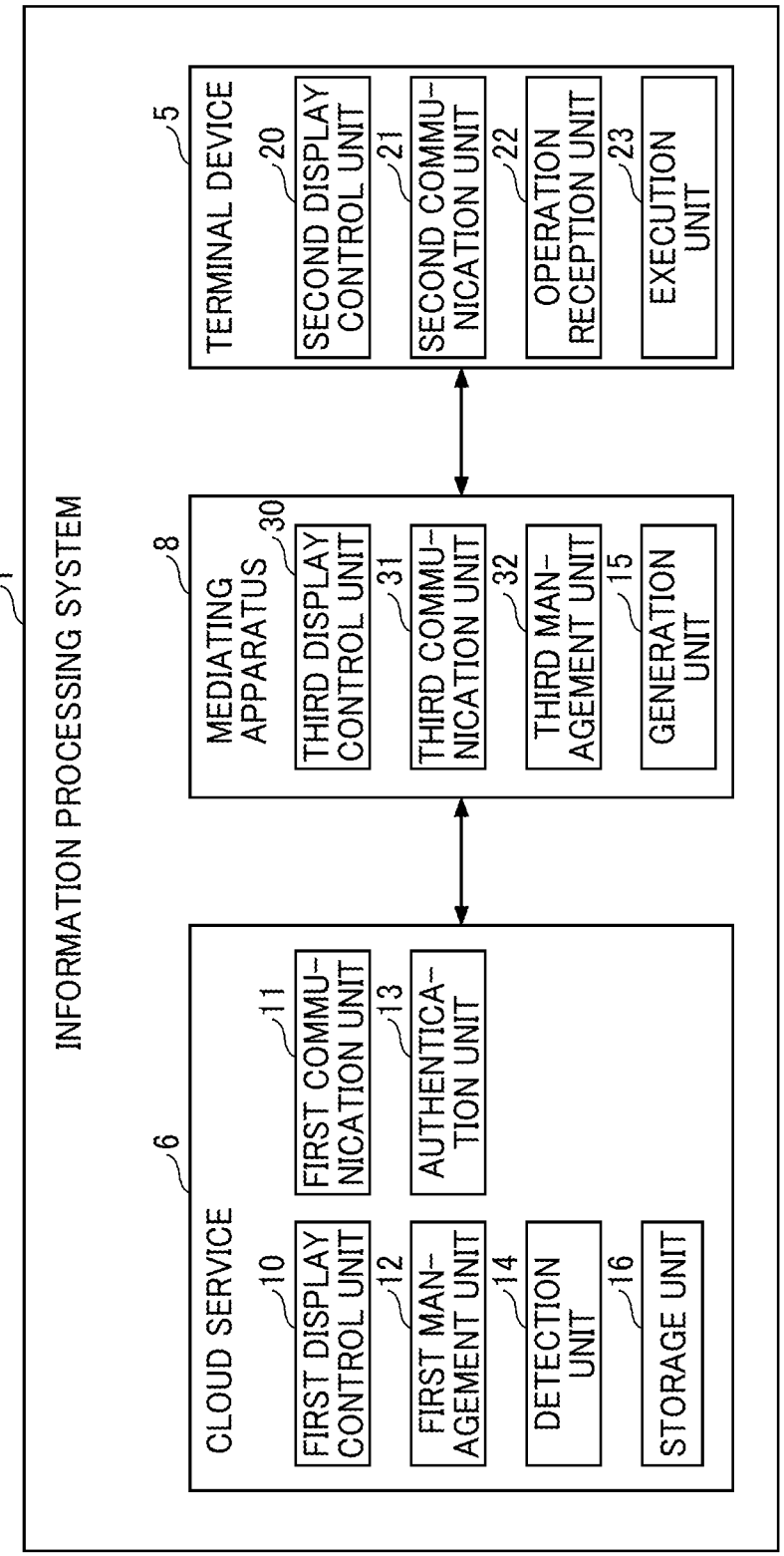
FIG. 11 is a block diagram illustrating an example of a functional configuration of the information processing system according to a second embodiment of the present disclosure.

Regarding a second embodiment of the present disclosure, points different from the first embodiment are described below. FIG. 11 is a block diagram illustrating an example of a functional configuration of the information processing system 1 according to the second embodiment of the present disclosure. The difference from the functional configuration in the first embodiment illustrated in FIG. 3 is that the generation unit 15 is not included in the cloud service 6, but included in the mediating apparatus 8. Accordingly, the generation of thumbnail image for the image file to be uploaded is performed by the mediating apparatus 8 instead of the cloud service 6.

Figure 12:
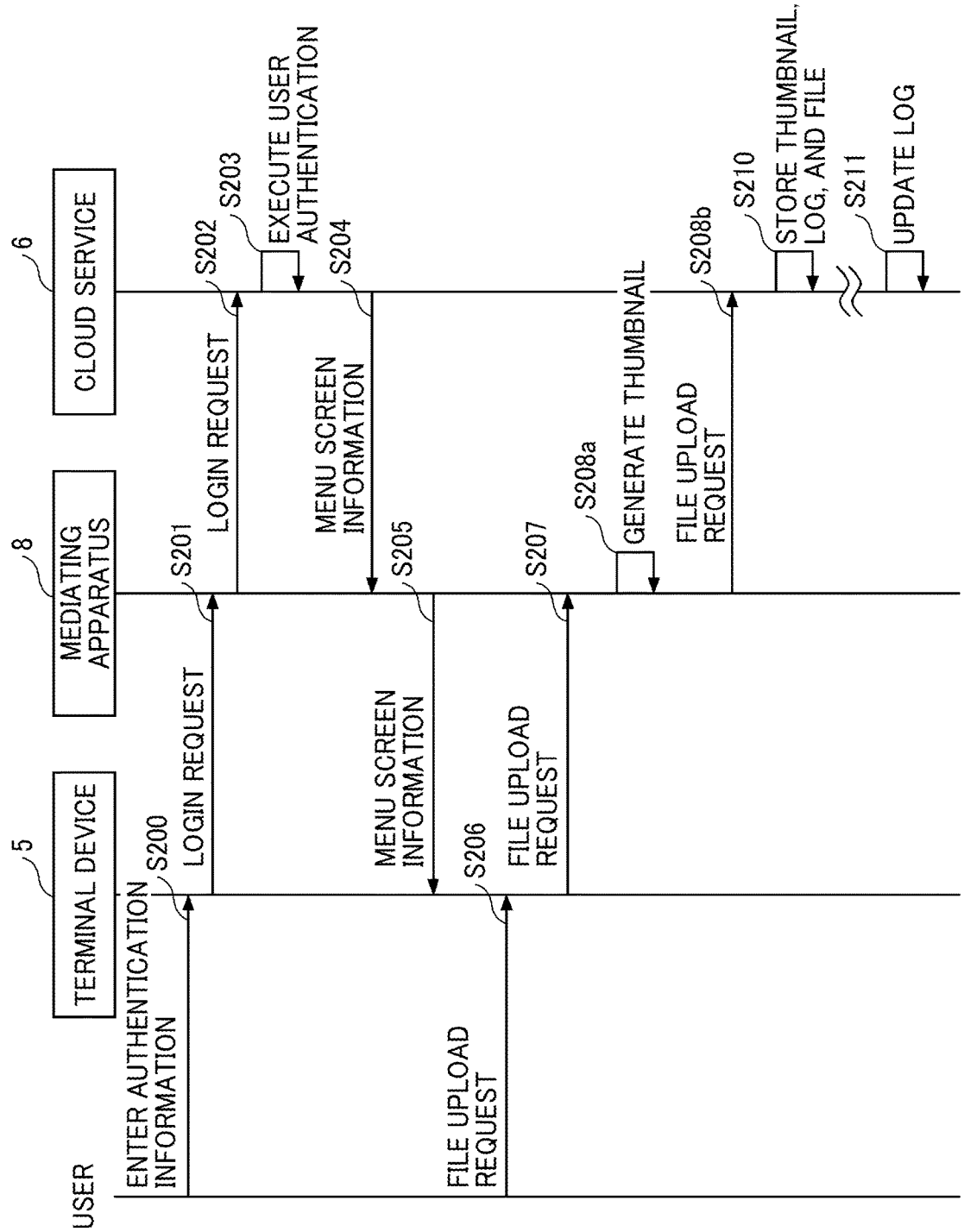
FIG. 12 is a sequence diagram illustrating an example of the file upload process according to the second embodiment of the present disclosure.

FIG. 12 is a sequence diagram illustrating an example of the file upload process according to the second embodiment of the present disclosure. The generation of the thumbnail image executed by the generation unit 15 of the cloud service 6 in step S209 of the process in the first embodiment illustrated in FIG. 4 is executed by the generation unit 15 of the mediating apparatus 8 in step S208*a* in the process in the second embodiment illustrated in FIG. 12. Furthermore, in the process according to the second embodiment, the third communication unit 31 of the mediating apparatus 8 transmits the file upload request message to the first communication unit 11 of the cloud service 6 in step S208*b*. This message includes the file to be uploaded as well as the thumbnail image generated in step S208*a*. Therefore, in the process of the second embodiment, the cloud service 6 does not generate the thumbnail image (step S209 in FIG. 4). The processing other than steps S208 and S209 is the same as in the first embodiment and the second embodiment.

Figure 13:
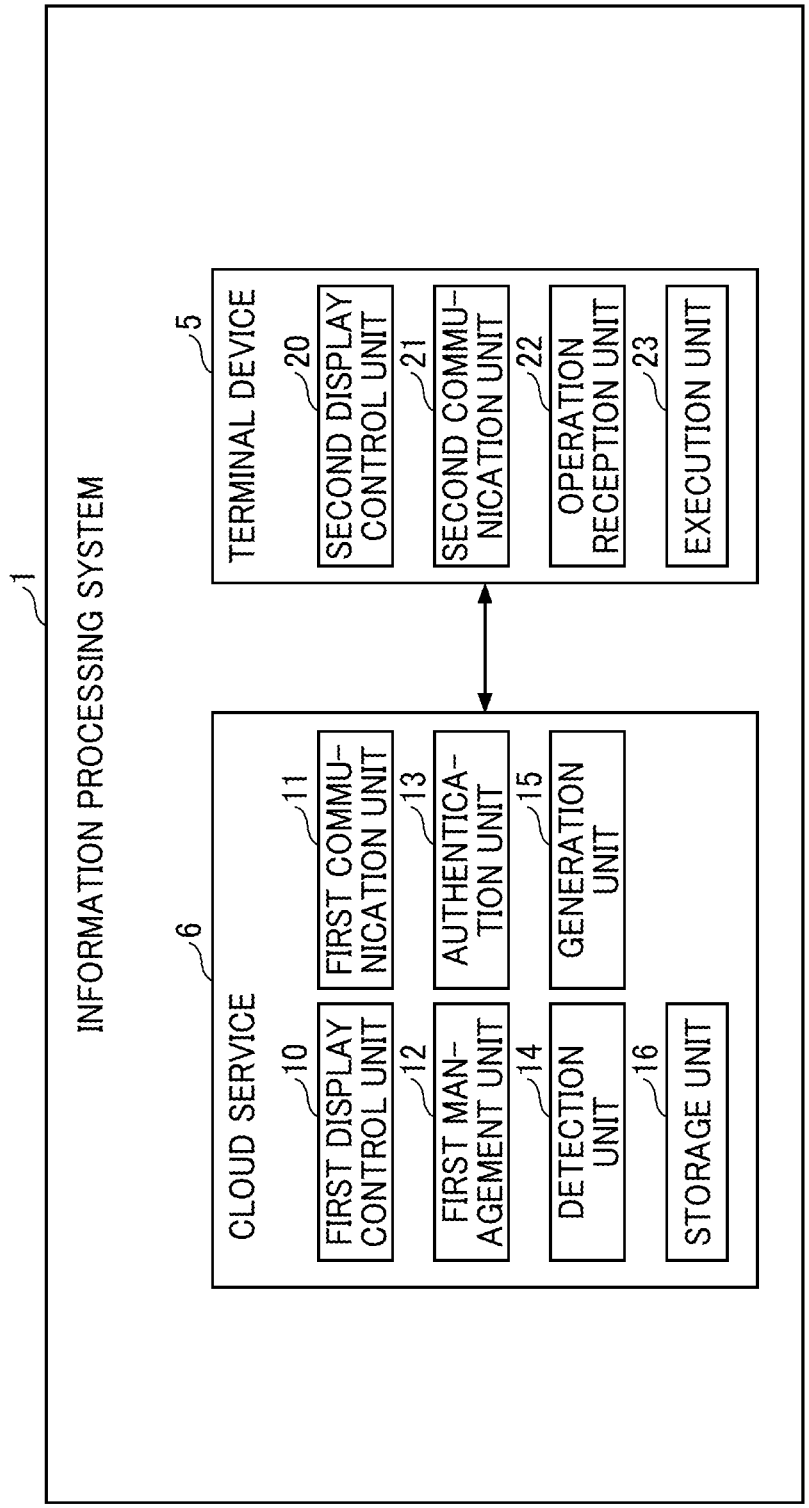
FIG. 13 is a block diagram illustrating an example of a functional configuration of the information processing system according to a third embodiment of the present disclosure.

Regarding a third embodiment of the present disclosure, points different from the first embodiment are described below. FIG. 13 is a block diagram illustrating an example of a functional configuration of the information processing system 1 according to the third embodiment of the present disclosure. The difference from the functional configuration of the first embodiment illustrated in FIG. 3 is that in the third embodiment, the mediating apparatus 8 is not provided and the cloud service 6 and the terminal device 5 directly communicate with each other. Also, in the file upload process illustrated in FIG. 4 and the file list screen display process illustrated in FIG. 5, the mediating apparatus 8 is not provided in the third embodiment and the cloud service 6 and the terminal device 5 directly communicate with each other. Except for these points, the processing in the first and third embodiments are the same.

The above-described embodiments are illustrative and do not limit the present disclosure. For example, elements and/or features of different illustrative embodiments may be combined with each other and/or substituted for each other within the scope of the present disclosure. Thus, numerous additional modifications and variations are possible in light of the above teachings.

For example, the functional block diagrams of FIGS. 3, 11, and 13 are divided according to the main functions in order to facilitate understanding of the processing by the information processing apparatus 2 that implements the information processing system 1. The present disclosure is not limited by the way of dividing the processing unit or the name. The processing in the information processing apparatus 2 can also be divided into more processing units according to the content of the processing. Further, one process may be divided to include a larger number of processes.

The apparatuses described are merely an illustration of one of several computing environments for implementing the embodiments disclosed herein. In some embodiments, the information processing apparatus 2 includes multiple computing devices, such as a server cluster. The plurality of computing devices is configured to communicate with one another through any type of communication link, including a network, shared memory, etc., and perform the processes disclosed herein.

Also, the first communication unit 11, the second communication unit 21, and the third communication unit 31 may be simply referred to as communication units, and provided that the units are clearly distinguished, the order of first, second, and third may be changed. The same applies to the first display control unit 10, the first management unit 12, and the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising:
circuitry configured to:
receive a plurality of files;
generate screen information for displaying a first list screen on a display, the first list screen presenting, for each of the plurality of files, a name and a time of last use of the file, and further presenting a thumbnail image of at least one file of the plurality of files in a case the at least one file is an image file;
calculate, for each of the plurality of files, an amount of time that has elapsed from the current time to the time at which each file of the plurality of files was last used;
determine, for each of the plurality of files, whether the amount of time that has elapsed is longer than a pre-set time period;
determine at least one file of the plurality of files to be an at least one unused file when it is determined that the amount of time that has elapsed since the at least one file was last used exceeds the pre-set time period;
generate screen information for displaying a third list screen on the display, the third list screen presenting, for the at least one unused file, a name and a time of last use of the at least one unused file, and further presenting a thumbnail image of at least one unused file in a case the at least one unused file is an image file;
store in one or more memories, the plurality of files and the thumbnail image of the at least one file being the image file;
transmit the screen information of the first list screen in response to a request; and
transmit the screen information of the third list screen in response to another request.

2. The information processing apparatus of claim 1, wherein
the circuitry is further configured to generate the thumbnail image from the at least one file being the image file.

3. The information processing apparatus of claim 1, wherein
the circuitry is further configured to receive the thumbnail image together with the at least one file being the image file.

4. The information processing apparatus of claim 1, wherein
the circuitry is further configured to:
generate screen information for displaying a second list screen on the display, the second list screen presenting the thumbnail image of the at least one file being the image file; and
transmit the screen information of the second list screen in response to another request.

5. The information processing apparatus of claim 1, wherein
the circuitry is further configured to store in the one or more memories, information on an operation performed on at least one file of the plurality of files.

6. The information processing apparatus of claim 1, wherein
the screen information of the third list screen includes prompts prompting a user to choose whether to keep or delete the at least one unused file.

7. An information processing system comprising:
the information processing apparatus of claim 1; and
a terminal device including circuitry configured to;
receive the screen information of the first list screen from the information processing apparatus; and
display on a display, the first list screen based on the screen information of the first screen.

8. An information processing system comprising:
a mediating server including circuitry configured to:
  receive a plurality of files from a terminal device; and
  generate a thumbnail image of at least one file of the plurality of files in a case the at least one file is an image file;
an information processing apparatus including circuitry configured to:
  receive the plurality of files and the thumbnail image of the at least one file from the mediating server;
  generate screen information of a first list screen for displaying on a display, the first list screen presenting, for each of the plurality of files, a name and a time of last use of the file, and further presenting a thumbnail image of the at least one file being the image file;
  calculate, for each of the plurality of files, an amount of time that has elapsed from the current time to the time at which each file of the plurality of files was last used;
  determine, for each of the plurality of files, whether the amount of time that has elapsed is longer than a pre-set time period;
  determine at least one file of the plurality of files to be an at least one unused file when it is determined that the amount of time that has elapsed since the at least one file was last used exceeds the pre-set time period;
  generate screen information for displaying a third list screen on the display, the third list screen presenting, for the at least one unused file, a name and a time of last use of the at least one unused file, and further presenting a thumbnail image of at least one unused file in a case the at least one unused file is an image file; and
  store in one or more memories, the plurality of files and the thumbnail image of the at least one file being the image file; and
another terminal device including circuitry configured to:
  receive the screen information of the first list screen and the third list screen from the information processing apparatus;
  display on a display, the first list screen based on the screen information of the first list screen; and
  display on a display, the third list screen based on the screen information of the third list screen.

9. An information processing method comprising:
receiving a plurality of files;
generating screen information for displaying a first list screen on a display, the first list screen presenting, for each of the plurality of files, a name and a time of last use of the file, and further presenting a thumbnail image of at least one file of the plurality of files in a case the at least one file is an image file;
calculating, for each of the plurality of files, an amount of time that has elapsed from the current time to the time at which each file of the plurality of files was last used;
determine, for each of the plurality of files, whether the amount of time that has elapsed is longer than a pre-set titre period;
determine at least one file of the plurality of files to be an at least one unused file when it is determined that the amount of time that has elapsed since the at least one file was last used exceeds the pre-set time period;
generating screen information for displaying a third list screen on the display, the third list screen presenting, for the at least one unused file, a name and a time of last use of the at least one unused file, and further presenting a thumbnail image of at least one unused file in a case the at least one unused file is an image file;
storing in one or more memories, the plurality of files and the thumbnail image of the at least one file being the image file;
transmitting the screen information of the first list screen in response to a request; and
transmitting the screen information of the third list screen in response to another request.

10. A non-transitory recording medium which, when executed by one or more processors on an information processing apparatus, causes the processors to perform the information processing method of claim 9.

* * * * *